United States Patent [19]

Bochat

[11] 4,090,285
[45] May 23, 1978

[54] PROCESS AND PRODUCT FOR FITTING A BRAKE SHOE TO A BRAKE DRUM

[76] Inventor: Elbert E. Bochat, 805 Miller Valley Rd., Prescott, Ariz. 86301

[21] Appl. No.: 768,066

[22] Filed: Feb. 14, 1977

[51] Int. Cl.² .......................... B21K 21/10; B23P 7/00
[52] U.S. Cl. ............................................... 29/401 F
[58] Field of Search ............ 29/401 R, 401 F, 401 D, 29/406, 407, 159 R, 445, 705; 188/250 A, 250 B; 33/178 B, 178 R

[56] References Cited

U.S. PATENT DOCUMENTS

| 1,728,172 | 9/1929 | Bendix | 29/445 |
| 1,747,672 | 2/1930 | Jeffrey | 29/445 X |

Primary Examiner—Milton S. Mehr
Attorney, Agent, or Firm—Ronald J. Clark

[57] ABSTRACT

A process and product is hereinafter described for fitting a brake shoe to a brake drum. The process comprises the steps of removing an existing brake shoe from a brake assembly; establishing the relationship of the arc of the curve of the removed brake shoe to its anchor pin; and fitting a new brake shoe to the established relationship between the arc of the drum and its respective anchor pin. An adjustable mechanism is shown whereby the relationship of the arc of the shoe to the anchor point can be established by movable mechanisms.

7 Claims, 10 Drawing Figures

PROCESS AND PRODUCT FOR FITTING A BRAKE SHOE TO A BRAKE DRUM

BACKGROUND OF THE INVENTION

The present invention is designed for use in a braking system wherein a brake shoe is caused to rub against a brake drum causing friction resulting in the braking action for a wheel.

The present invention is designed to enable the replacement of worn brake shoes with a new set of brake shoes such that the replacement brake shoe fits the drum just as uniformly as the worn brake shoe.

While the braking assembly described hereinafter is principally used in an automobile system, this is not deemed to be a limitation on the invention, rather, this is the best form of embodiment known to the Applicant.

A typical braking assembly comprises a stationary portion consisting of a backing plate and an anchor pin mounted on the backing plate. One end of each of a primary and secondary brake shoe are engageably positioned against an anchor pin and a hydraulic actuator mechanism. The other end of each brake shoe is connected to a brake adjustment mechanism. The movable portion of the braking assembly is the brake drum which rotates about the stationary braking subassembly. When the automobile is moving in the forward direction, the frontmost brake shoe (that toward the front of the automobile) is considered to be the primary brake shoe. The rear-most brake shoe (that toward the rear of the automobile) is considered to be the secondary brake shoe. The above relationship is based on the anchor pin being located at the top of the brake assembly.

When the brakes are applied while the car is moving in the forward direction, the primary shoe moves away from the anchor first and contacts the drum. The rotation of the drum causes the primary shoe to energize the secondary shoe. This contact between the primary shoe and the secondary shoe forces the secondary shoe against the anchor pin, limiting its movement. Since the movement of the secondary shoe is stopped by contact with the anchor pin, the secondary shoe is now forced against the drum causing friction to be generated between the drum and the secondary shoe causing the wheel to decelerate and eventually stop if the braking contact is not removed.

It is important to note that the secondary shoe fits snugly against the drum in its proper mode of operation. For the present invention to operate in its most efficient manner, it is assumed that in the original condition the secondary shoe is positioned equidistant from the drum over the length of the shoe. In other words, during manufacture the original shoe is placed in the subassembly and the manufacturing tolerances of the assembly is such that the braking surface of the shoe is positioned an equidistance from the surface of engagement of the drum. Since the original brake shoe is placed equidistant from the drum over the length of the shoe, then as the shoe wears during the braking process, it wears evenly over the entire surface area of the braking surface. During the braking action as described hereinabove, the secondary shoe is caused to bear against the drum surface and in this manner the secondary shoe is caused to fit intimately within the braking assembly. As mentioned hereinabove, the movement of the secondary shoe during forward movement is limited by the anchor pin. During the operation of the braking system and the wearing away of the braking material on the brake shoe, a very important relationship is established between the arc of the brake shoe as represented by the braking material and the engagement with the anchor pin.

When the brake shoes have been worn and it is time for their removal, a new set of brake shoes is obtained. The new brake shoes have been manufactured with a standardized arc of curvature for the braking material; however, there is no assurance that the arc of curvature of the replacement brake shoe will match the arc of curvature of the drum within the wheel assembly that the new shoes are to be positioned. If the arc of curvature of the replacement brake shoes do not closely match the arc of curvature of the brake drum, then the new brake shoes will wear unevenly; cause error in the brake adjustment mechanism of the brake assembly; cause failing of the brake system on a vehicle having more than one brake due to the unequal braking force generated in each of the wheels having a braking assembly. The purpose of the present invention is to eliminate these disadvantages and provide a mechanism and means whereby the replacement brake shoe is caused to match intimately the arc of curvature of the inner surface of the drum surface.

In the prior art, the replacement brake shoes are merely added into the braking assembly by removing the old brake shoes and substituting the new brake shoes without adjusting the arc of curvature of the replacement shoes or adjusting the engageable connection between the replacement brake shoes and the anchor pin.

In a second form of the prior art method of replacing brake shoes, the replacement brake shoes are placed on a grinding apparatus and sufficient braking material is removed from the new brake shoes so that the arc of curvature of the replacement brake shoes identically reproduces the arc of curvature of the old brake shoes. However, in this second mode of operation of the prior art replacement process, no effort is made in adjusting the relationship between the arc of curvature of the brake shoe and the engageable connection part of the brake shoe at the anchor pin. While the arc of curvature of the replacement brake shoe is caused to match the arc of curvature of the original brake shoe thus eliminating certain problems of the prior art, not all such problems are eliminated as will be described in greater detail hereinafter.

SUMMARY OF THE INVENTION

The present invention relates to braking systems and, more particularly relates to a method for adjusting a replacement brake shoe to fit intimately with the existing brake drum.

Another object of the present invention is to provide a method for adjusting a replacement brake shoe to reproduce the same relationship between the arc of the curve of the braking material and its engageable anchor pin as that of the original brake shoe.

A further object of the present invention is to establish the proper relationship between the arc of curvature of the brake material and the engageable anchor pin by removing braking material from the braking shoe.

A still further object of the present invention is to provide a method for establishing the relationship between the arc of curvature of a replacement brake material and its engageable anchor pin by removing some of the material from the brake shoe at the anchor point.

Another object of the present invention is to provide a method for establishing the relationship between the arc of curvature of the brake material and the engageable anchor pin by adjusting the arc of curvature of the shoe member itself.

A further object of the present invention is to provide a method for replacing the brake shoe in a brake assembly wherein it is necessary to turn down the brake drum of the brake assembly.

A still further object of the present invention is to provide a method for adjusting a brake shoe which is operable whether the brake shoe is positioned within the brake drum or it is externally positioned on top of a test jig.

Another object of the present invention is to provide a means to establish the relationship of the arc of the curve of the removed brake shoe to its anchor pin, and a means for determining that a new brake shoe is fitted to the established relationship between the arc of the drum and its respective anchor pin.

A BRIEF DESCRIPTION OF THE FIGURES

DETAILED DESCRIPTION OF THE INVENTION

Figure 1:
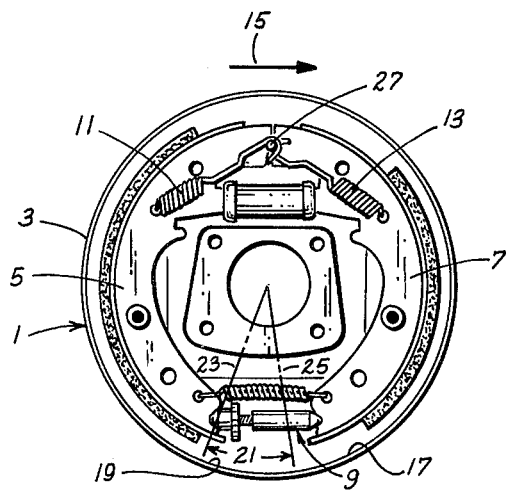
FIG. 1 shows a general schematic view of the basic elements of a brake assembly.

Referring to FIG. 1, the brake assembly is indicated generally at 1 comprising a brake drum 3, a primary shoe 7 and a secondary shoe 5. The brake adjustment mechanism is indicated at 9 while the primary tensioning spring is shown at 13 and the secondary tensioning spring is shown at 11.

The brake assembly shown at FIG. 1 would be of the type found on the right front wheel of a typical automobile. More specifically, the front of the car is in the direction of the arrow head of the arrow 15. The primary braking shoe 7 is in the forward direction of a car moving forward while the secondary braking shoe is on the trailing side of the brake assembly. The primary braking shoe 7 is used to develop the activating force to exert upon the secondary braking shoe 5 when the car is moving in the forward direction and the brakes are applied. The secondary shoe 5 is employed to generate the activating force for the primary shoe 7 to stop the car when the car is moving in the backward direction.

As can be seen when viewing FIG. 1, one of the brake shoes is a leading brake shoe 7 while the other is a trailing brake shoe 5. The trailing shoe 5 generates the major portion of the braking force for the car with the remaining braking force being generated by the leading shoe 7. As described earlier, the leading shoe 7 responds to the application of the brake pedal by the operator to exert an activating force against the trailing shoe 5 so that the trailing shoe is pushed against the inner engagement surface of the brake drum 3. This inner surface of the brake drum is called a drum braking surface. The drum braking surface is shown at 17 in FIG. 1. The braking surface is circular in cross-section and an arc of that surface is shown at 19. The length of the arc is represented by the arrow 21 between the dotted lines 23 and 25.

While all brake assemblies have drum braking surfaces which can be generally referred to as circular in cross-section, each such surface has a different relationship with its anchor point shown at 27.

Similar elements in each of the Figures will be represented by the same numbers.

Figure 2:
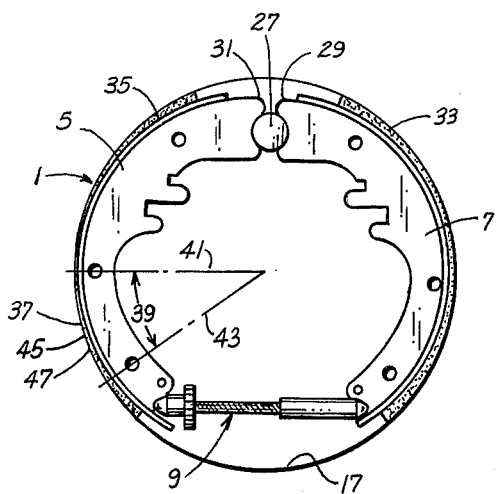
FIG. 2 shows a schematic view of a brake assembly wherein the brake adjustment mechanism has forced the brake shoes snugly against the brake drum.

Referring to FIG. 2, there is shown a view of a braking assembly 1 wherein the brake shoes 5 and 7 are ready for replacement. This is indicated by the full extension of the brake adjustment mechanism 9 wherein the brake adjustment mechanism has pushed the brake shoes firmly and fully against the braking surface 19. The anchor point is shown at 27. Both the primary shoe 7 and the secondary shoe 5 are equipped with an anchor receiving surface shown generally at 29 and 31, respectively. The anchor receiving surface of each brake shoe is also referred to as the anchor point of its respective shoe. The anchor pin is generally circular in cross-section and is received by the similarly shaped anchor receiving surface 29 and 31, respectively.

As shown with reference to FIG. 2, the brake shoes 5 and 7, through use, are made to conform to the arc of the drum braking surface 19. More specifically, a braking element 33 of the primary braking shoe 7 and a braking element 35 of the secondary braking shoe 5 are made of standard braking substances which wear away through use. Accordingly, when the brake shoes are ready to be replaced, this material has worn away to conform the braking material to have a complementary shape to the brake drum braking surface 17. Stated another way, a brake shoe fits perfectly after it has worn down to match the drum braking surface 17 of the brake drum assembly 1. The arc of the curve of the brake shoe matches the arc of the curve of the drum braking surface. Also, since the secondary brake shoe has worn when its anchor pin receiving surface 31, is in contact with the anchor point 27, the relationship of the anchor point of the shoe to the arc of the braking material 35, is perfectly established.

The arc of the braking element 35 is the portion 37 of that surface where it meets the drum braking surface 17. This portion of the braking surface 37 is indicated by the arrow 39 lying between the lines 41 and 43. This portion of the braking surface establishes an external arc of a braking element 45 which matches an internal arc 47 of the drum braking surface 17. In this manner, the external arc 45 matches perfectly the internal arc 47 because they are established through wear and tear of the braking element 35.

Figure 3:
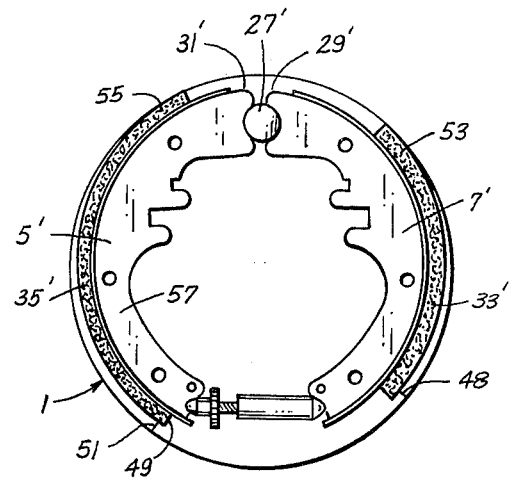
FIG. 3 shows a brake assembly wherein the brake shoes are ill-fitting and contact the drum at one extremity of the brake shoe while the other extremity is spaced from the brake drum.

FIG. 3 demonstrates the problem when replacement braking shoes 5' and 7' are inserted directly into the brake assembly 1 to replace the original braking shoes 5 and 7, respectively. During manufacture the brake shoes are formed with anchor pin receiving surfaces such as 29' and 31' which are semicircular in form and which have an arc calculated to match the arc of the anchor pin 27'. In this manner, the anchor pin receiving surfaces 29' and 31' fit perfectly the arc of the anchor pin 27'. However, due to small differences in brake assemblies, the replacement shoes 5' and 7' will not fit perfectly to the drum braking surface 17 with respect to anchor pin 27'. This is shown by the distance that a far end 45 of primary shoe 7' is spaced from the braking surface 17 as represented by the line 48. This is also represented by the spacing of the far end 49 of the secondary shoe 5' from the braking surface 17 as represented by the line 51. In this manner, there is contact between the replacement shoe 7' and the braking surface at the close end 53 of that shoe before the brakes are applied while the far end 45 is spaced from the braking surface 17. Correspondingly, a near end 55 of the secondary shoe 5' is also in contact with the braking surface 17 while the far end 49 is spaced from the braking surface 17.

The prior art teaches principally one procedure for causing the replacement brake shoes 5' and 7' to match the arc of the braking surface 17. This is achieved by automatic mechanisms whereby the arc is determined by measurement and portions of the braking elements 33' and 35' are ground away so that the brake shoes are made to fit the curve of the arc. In this manner, a significant amount of braking material can be removed from the brand new shoes during installation so as to reduce the period of service of these replacement shoes. In other words, when the car is driven out after having its replacement shoes attached, each brake shoe already has a considerable amount of braking element removed. This leads to premature brake wear and the subsequent requirement for an additional set of replacement shoes.

If the method of grinding the replacement shoes 5' and 7' to fit the drum braking surface is not followed, then the following situations might occur. Each situation is detrimental to the life of the replacement brake shoes and also affect the safety of the driver of the vehicle. First, the braking ability of the new brake shoes is impaired because only a portion of the braking material is bearing against the drum braking surface. This results in the braking force being reduced while the braking material is worn away or requires a considerable amount of additional force to force the entire braking surface of the braking material to come into contact with the drum braking surface. Second, each wheel may have a different portion of the braking surface area of the braking material in contact with the drum braking surface causing a different amount of braking force to be applied to each wheel. This causes the automobile to pull towards either the left or right hand direction on the application of brakes, depending upon which wheel is braked the hardest. Third, since the brake adjustment mechanism 9 operates on the principle of sensing the space between anchor post 27 and anchor receiving surface 31 while backing up, false signals are created which tend to force the far ends 45 and 49 of the replacement brake shoe against the drum braking surface. It is obvious then, that if the far ends 45 and 49 of the replacement brake shoes 7' and 5', respectively, are forced closer to the drum braking surface 17, then the near ends 53 and 55, respectively, are forced tighter against the drum braking surface. At best this results in early braking material wear and, more commonly, results in the brake assembly locking up. In other words, the brake adjustment circuitry senses the space between the anchor post 27 and anchor receiving surface 31 and pushes, as shown in FIG. 2, the brake shoes more firmly in contact with the drum braking surface. However, the brake adjustment mechanism 9 does not know that the near end of the brake shoes are already in contact with the drum braking surface, or in the alternative, are in closer spaced relationship to the drum braking surface 17. This means that while the far ends of the brake shoes are placed in proper relationship to the drum braking surface 17 the near ends are forced into intimate contact with the drum braking surface 17. Oftentimes, when the replacement brake shoes are ill-fitted to the brake assembly, as shown with reference to FIG. 3, and the brake adjustment mechanism is allowed to operate normally, the brakes are forced so firmly against the drum braking surface 17 that the brakes lock into place.

The solutions offered by the apparatus and method of the present invention are principally three in nature, namely:

(a) Removing a portion of the anchor pin receiving surface, such as shown in 31', so as to adjust the external arc of the braking element 45 of the secondary shoe to match the internal arc 47 of the drum braking surface 17 by adjusting the fit of the secondary anchor pin receiving surface 31' with the anchor pin 27. The procedure is then applied to the primary shoe.

(b) Adjusting the external arc 45 of the braking element 33 by adjusting the backing member such as 57 through stretching, bending, or otherwise straightening the entire secondary brake shoe so as to adjust the external arc 47 of the braking element to fit the shoe better to the drum. The procedure is then applied to the primary shoe.

(c) A combination of (a) and (b) above.

Figure 4:
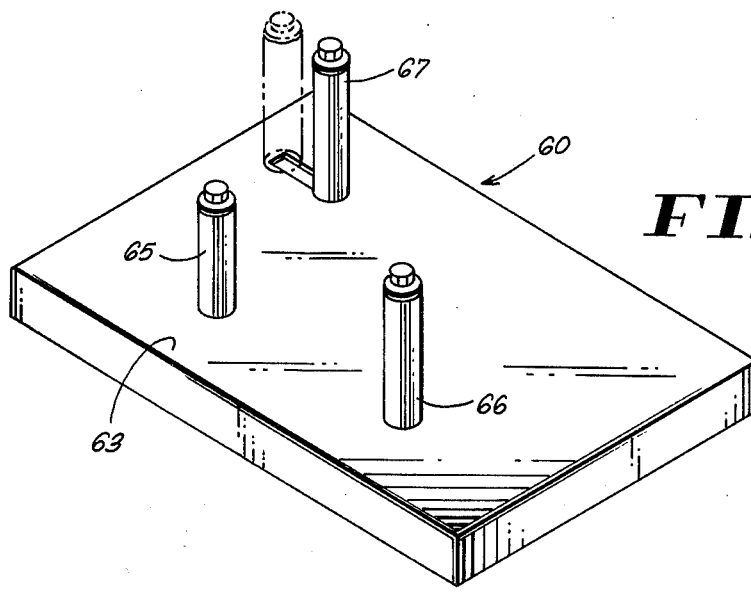
FIG. 4 shows the mechanism for establishing the relationship between the arc of curvature of the braking material on the brake shoe and the engageable brake connector.

Referring to FIG. 4, there can be seen an arc adjustment mechanism indicated generally at 60 comprising a base plate member means 63 supporting a first stationary member means 65 and a secondary stationary member means 66 for establishing the arc of the curve of the worn brake shoe. An adjustable third member means 67 is mounted on the base plate 63 and is spaced from the stationary members 65 and 66. The movable member 67 is spaced a convenient distance from the stationary members 65 and 66 so as to receive the anchor pin receiving surface 31' of a brake shoe such as 5. The stationary member means 65 and 66 represent any two points on the arc of the curve of the braking material member such as 35 of a replacement shoe such as 5. The spacing of the movable member 67 from the stationary members 65 and 66 can be calculated from the relative size of the replacement shoes and the brake assembly into which the replacement shoes are to be replaced. More specifically, for huge tractor or other type of shoes, the relative spacing of the movable member 67 from the stationary members 65 and 66 can be calculated by the size of the brake drum assembly into which the brake shoes are to be placed. In operation, the old secondary brake shoe such as 5 shown in FIG. 2, is positioned against the stationary members 65 and 66 such that the material 35 is in contact with both stationary members 65 and 66. The movable member 67 is then adjusted such that it is received by the anchor pin receiving surface 31 of the old brake shoe in the same relationship as the anchor pin 27 of the brake assembly shown in FIG. 2. By this simple mechanism, the relationship of the external arc 49 of the brake element 35 on the brake shoe 5 is established to the anchor pin 27 within the braking assembly 1. Now a new brake shoe is adjusted by filing its anchor pin receiving surface so as to make the anchor pin receiving surface receive movable member 67 intimately while still in contact with stationary members 65 and 66. Then the shoe will fit perfectly within the brake assembly 1 shown in FIG. 2.

Briefly, the arc adjustment mechanism comprises a base plate member means 63 having mounted thereon at least two stationary member means 65 and 66 for establishing the arc of the curve of the old secondary brake shoe removed from an existing brake assembly. A movable member means 67 is employed for establishing the relationship between the arc of the curve of the old secondary brake shoe and its respective anchor pin. In this manner the stationary member means and the movable member means establishes a mold from which a replacement brake shoe can be adjusted to fit perfectly into the existing brake assembly from which the old brake shoe was removed.

In review, the adjustment of the new brake shoe can be achieved by filing, grinding, or otherwise removing a portion of the anchor pin receiving surface such as 31 so that the anchor pin receiving surface of the replacement brake shoe fits snugly into the movable member means 67 at the same time as its braking material 35 is in contact with the stationary member means 65 and 66.

Referring to FIGS. 5 through 8, there can be seen the basic steps of the process whereby a new brake shoe is caused to be molded to fit the arc adjustment mechanism which was adjusted according to the discussion with relationship to FIG. 4.

Figure 5:
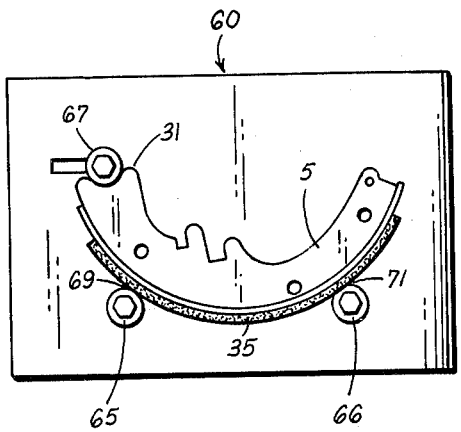
FIG. 5 shows the old brake shoe fitted within the jig to establish the relationship between the arc of the shoe and the anchor point.

Referring to FIG. 5, the arc adjustment mechanism 60 comprises the base plate member 63, the pair of stationary members 65 and 66 and the movable member 67. The existing shoe 5 is shown positioned such that its braking material 35 is in contact with the stationary member means 65 and 66 at points 69 and 71, respectively. The movable member 67 is adjusted so as to be received snugly by the anchor pin receiving surface 31.

At this time the three members 65, 66 and 67 define perfectly the relationship of the arc of the curve, external arc 45 of the braking element 35 of the brake shoe 5 to its anchor pin 27.

In practical operation it has been found that the trailing shoe or the secondary shoe 5 is the better brake shoe to use to define the three points represented by members 65, 66 and 67. Since the trailing shoe or secondary shoe 5 is used for the major portion of the braking force of the brake assembly while in contact with the anchor pin, it is caused to bear against the drum surface and is therefore worn to fit intimately the curve of the brake surface and the anchor pin. The trailing shoe conforms more naturally under the brake pressure of the operator against the drum braking surface 17. The secondary brake shoe or trailing shoe 5 is forced against the drum braking surface 17 under the control of the leading shoe 7. It is acknowledged that in a backing situation the leading shoe becomes the trailing shoe but as a practical matter, braking occurs much more often when the car or truck is being driven forward than when the car or other vehicle is backing up. Obviously, when the vehicle is backing more often than it is being driven forward, then the leading shoe might conform more to the drum braking surface than the trailing shoe. In this situation, that shoe which conforms most is used as the mold member. In the case where the vehicle is moving backwards and being braked in the backing condition more than when it is being braked in the forward condition, then the leading shoe should be used as a mold member.

When installing a new brake shoe into an existing drum, whether the drum has been turned or not (machined out to eliminate any grooves or irregularities in brake surface area of drum) the first step is to match the arc of the new brake shoe to the arc of the existing brake drum (without regard to the anchor pin). The invention accomplishes this by stretching, bending, or otherwise straightening the brake shoe backing member (item 57, FIG. 3).

Figure 9:
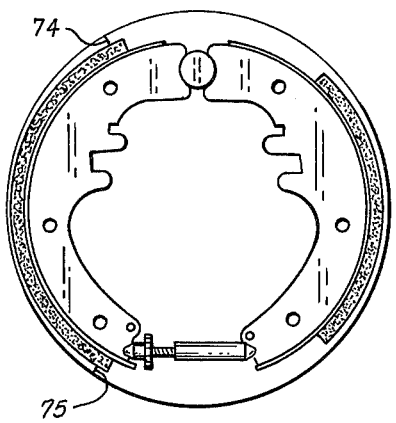
FIG. 9 illustrates a common situation when installing a replacement brake shoe into a used brake assembly.

Referring to FIG. 9, a typical new shoe does not perfectly fit the existing drum, leaving spaces 74 and 75.

Figure 10:
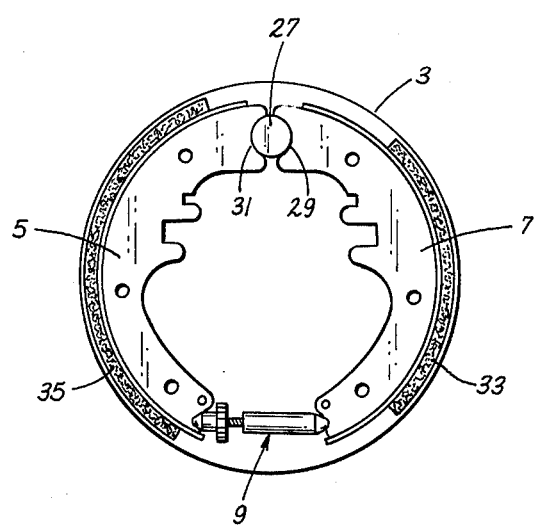
FIG. 10 illustrates one step of fitting a replacement brake shoe into a used brake assembly by straightening the replacement brake shoe.

Referring to FIG. 10, after the shoe has been stretched, bent, or otherwise straightened, the brake shoe fits the existing drum, with the elimination of spaces 74 and 75. By stretching, bending or otherwise straightening the brake shoe, there is no requirement for grinding material off the brake surface area of the new brake shoe, thereby preventing the loss of any braking material.

In the event that the drum is turned down an amount such as one fifty-thousandth of an inch, a spacer is placed between the old shoe when placed into the mold shown in FIG. 5 to allow for this change.

Figure 6:
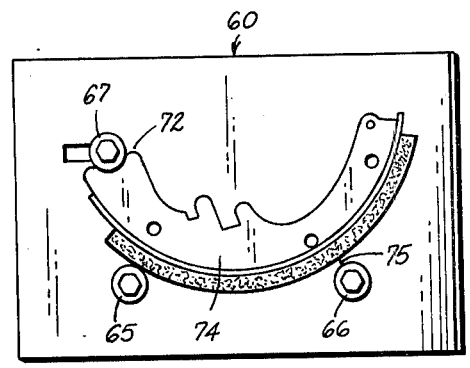
FIG. 6 shows the new shoe placed in the jig with the anchor point received by the anchor receiving mechanism of the shoe without adjustment.

Referring to FIG. 6 there is shown the relationship of a new shoe 7' having been fitted to the arc of the drum by previously described procedures, with reference to FIGS. 9 and 10, when placed in the arc adjustment mechanism such that its anchor pin receiving surface 72 is fitted snugly with the movable member means 67. In this view the replacement brake shoe 74 is shown spaced from the second stationary member means 66. This space is indicated by the line 75.

Figure 7:
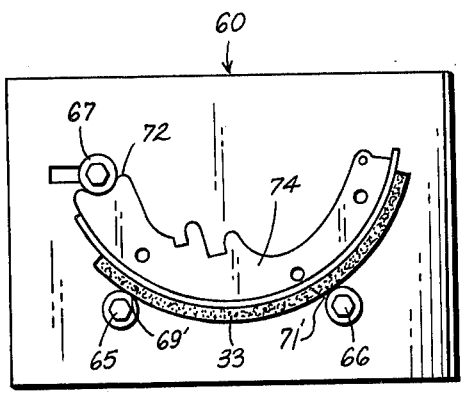
FIG. 7 shows the new shoe adjusted to the arc of the old shoe as established by the jig.

Referring to FIG. 7, the replacement brake shoe is shown having been adjusted to that relationship where its points 69' and 71' are in contact with the first and second stationary member means 65 and 66, respectively. The way to accomplish this is to file away, abraid or otherwise remove material from the anchor pin receiving surface 72 so that the braking material 33 is caused to come in contact with the second movable member means 66.

In review, the three steps of the process for adjusting a replacement brake shoe to fit perfectly into an existing brake assembly wherein an original secondary brake shoe has been used and is now to be replaced consists as follows:

The fitting of a replacement brake shoe into a used brake assembly comprising the following sequential steps:
 (a) Establishing a mold depicting the relationship of the arc of the curve of the existing secondary brake shoe with its corresponding anchor pin; and
 (b) Fit the arc of the replacement brake shoe to the arc of the existing drum; and
 (c) Removing material from the anchor pin receiving surface of the replacement shoe to fit the mold described in (a).

The primary and secondary replacement shoes are fitted according to the steps of the process as outlined with relation to FIGS. 5, 6, 7, 9 and 10.

Figure 8:
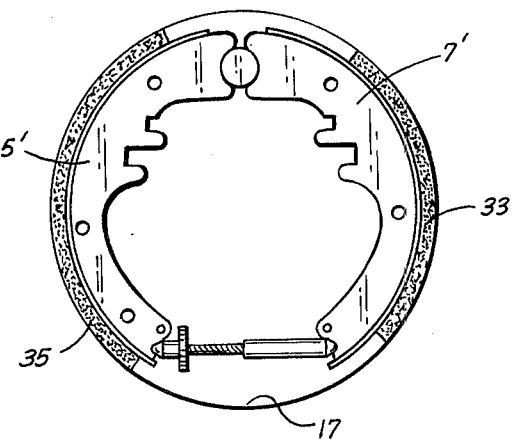
FIG. 8 shows the new shoe adjusted according to the method of the present invention placed within the drum and being positioned equidistant from the brake drum.

Referring to FIG. 8, there can be seen the improvement over the replacement shoes 5' and 7' when compared to FIG. 3. In this manner the braking material 33 and 35 is ideally spaced equidistant from the drum braking surface 17. This is shown by the absence of any space such as 48 and 49 as shown with reference to FIG. 3. The ideal spacing of the brake shoes 5' and 7' from the braking surface 17 is in the neighborhood of 20 mils. This cannot be conveniently shown in FIG. 8 due to the scale used in the drawings.

A braking assembly shown in FIG. 8 has the following advantages.

(1) Brake wear is uniform over the entire braking materials 33 and 35.

(2) Brake life is extended due to the elimination of any uneven application of the braking material to the drum braking surface 17.

(3) All brakes apply equal braking force to the vehicle and the vehicle brakes in a straight line.

(4) Brake lock-up is avoided due to the proper spacing of the brake shoes from the drum braking surface.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for replacing brake shoes comprising secondary and primary shoes in a brake assembly to assure that the replacement brake shoes properly fits the brake drum of the used brake assembly, comprising the steps of:

establishing the relationship of the arc of the curve of the secondary and primary shoes to its anchor pin; and fitting a new brake shoe to the established relationship between the arc of the drum and the respective anchor pin.

2. The process as recited in claim 1, wherein the worn secondary shoe is used to establish the relationship of the arc of the curve of the secondary and primary shoes to its anchor pin.

3. The process as recited in claim 1, wherein the step of fitting further comprises:

straightening each replacement brake shoe so that the braking surface of each replacement brake shoe is substantially equidistant from the braking surface of the brake drum in the used brake assembly.

4. The process as recited in claim 1, wherein the step of fitting further comprises:

removing material from the anchor pin receiving surface of each replacement brake shoe to insure a snug fit between said receiving surface of each new replacement brake shoe and the anchor pin of the used brake assembly.

5. The process as recited in claim 1, wherein the drum braking surface is turned down a uniform amount prior to fitting the replacement brake shoes.

6. The process as recited in claim 1, wherein the worn primary shoe is used to establish the relationship of the arc of the curve of the secondary and primary shoes to their anchor pin.

7. The process as recited in claim 1, wherein a portion of each replacement brake shoe is ground away prior to fitting such replacement brake shoe.

* * * * *